Patented Feb. 5, 1946

2,394,456

UNITED STATES PATENT OFFICE 2,394,456

STABILIZATION OF VITAMIN A AND VITAMIN A-CONTAINING MATERIAL

John Korner, Philadelphia, Pa., and Horatio Porter Loomis, Vineland, N. J., assignors to Silmo Chemical Corporation, Vineland, N. J., a corporation of New Jersey No Drawing. Application October 14, 1943, Serial No. 506,224

7 Claims. (Cl. 99—2)

This invention relates to the stabilization of vitamin A and vitamin A-containing material, whether or not this material is of oily or fatty nature, and is herein disclosed in some detail in an enriched poultry and animal supplement. Other uses will also appear.

One of the problems facing manufacturers of vitamin A preparations arises from the fact that vitamin A is unstable, is readily destroyed by atmospheric oxidation and autoxidizes readily, yielding biologically inactive products. Because of this fact, vitamin A preparations have had to be kept in an inert atmosphere or in containers evacuated of air, to avoid the loss of vitamin A. It is not impossible for a preparation containing unstabilized vitamin A to lose 50% of its potency in a short period of time. This decrease of potency is very expensive to the manufacturer, who is thereby forced to incorporate excessive amounts of vitamin A in his products.

There are many compounds known which will prevent or retard oxidation of vitamin A containing materials, but practically all of them are unsuitable because they are either toxic, and therefore cannot be used for human or animal consumption, or they impart a bad odor and taste to the material. Some of these stabilizing agents are too volatile; while others are relatively insoluble in the vitamin A containing products. For example, hydroquinone and related compounds are regarded as biologically harmful, whereas lecithin or wheat germ oil, which have some useful effect, have proved to be commercially impracticable because their anti-oxidation value is too slight. Other anti-oxidants such as gallic acid, methyl or propyl ester have also proved useless commercially, having too little stabilizing effect to effectively solve the commercial problem of producing vitamin A-containing material stabilized for a long period of time. Therefore, there has remained for commercial use only inert gases or vacuum to successfully prevent deterioration of the vitamin A in vitamin A products.

Particularly in the manufacture of commercial feedstuffs, such as poultry feeds, vitamin A addition is important. There vitamin A and D oils are added to give these feeds additional vitamin A over the pro-vitamins or vitamin precursors found in corn, alfalfa leaf meal, etc.

The loss of vitamin A from the vitamin A and D oils and the vitamin A precursors from their carriers is very great. According to the present invention, a very satisfactory, effective stabilization of the vitamin A and apparently of the vitamin A precursors may be obtained by incorporating into the material, carrying said vitamin A, minute quantities of normal-propyl-gallate and of beta-amino-ethyl alcohol bound to a glycerophosphoric radical which often occur in commercial lecithin obtained from soy beans.

For commercial stabilization, 0.1%–0.15% of each is usually adequate, but lower amounts are useful for short term storage. Above 0.3% addition of agents, the rate of increased stabilization falls off.

The stabilizing effect of the beta-amino-ethyl alcohol bound to a glycerophosphoric radical is itself very small, but in the quantities used, it greatly increases the stabilizing effect of the normal-propyl-gallate, as can be seen by the following experiments.

In very highly concentrated vitamin A preparations, which do not contain any tri-glycerides, normal-propyl-gallate itself is without any effect, but becomes highly effective in combination with the beta-amino-ethyl alcohol bound to a glycerophosphoric radical. This is disclosed by the following set of experiments.

To prepare a commercial poultry and animal feeding supplement in the preferred form and in which the vitamin A is highly stabilized, 0.1% of normal-propyl-gallate was dissolved in vitamin-containing fish liver oil by heating to 140° C., thus obtaining an oil of the desired vitamin A and D content. After cooling to normal temperature there was added 0.15% of the beta-amino-ethyl alcohol bound to a glycerophosphoric radical and stirred until dissolved. This mixture of oil and stabilizers was then stirred into commercial feeding oat meal and commercial soybean oil meal to take up the oil, and thus made a dry oil-carrying material.

A quantity of this supplement prepared according to these directions when subjected to an accelerated test comprising an atmosphere of oxygen at elevated temperature, retained its full vitamin A potency for the duration of the test, which was over 10 weeks.

A control sample prepared in the same manner, but not containing the aforementioned stabilizers, when subjected to the same test lost 40% of its vitamin A content in two weeks.

Another test lot of this stabilized supplement when stored under normal conditions retained its vitamin A potency for over 9 months, as shown by physical and biological assays.

The normal-propyl-gallate and the beta-amino-ethyl alcohol bound to a glycerophosphoric radical are completely harmless, as shown by biological tests. Since they are also odorless and tasteless in the proportions used, an oil stabilized as in the foregoing example may be mixed with other materials or packaged in the usual manner for human administration.

Having thus described certain embodiments of the invention, what is claimed is:

1. A composition of matter consisting of vitamin A, a carrier for the vitamin, propyl gallate in said carrier in an amount insufficient to effectively stabilize the vitamin, and amounting to about 0.1% or more, and beta-amino-ethyl alcohol bound to glycerophosphoric radical in an amount adapted to make the propyl gallate an effective stabilizer in excess of the stabilization contributed by the independent operation of the two stabilizers.

2. A composition of matter consisting of vitamin A and associated oil material, a carrier for the material and vitamin, propyl gallate in the carrier in an amount insufficient to stabilize effectively the vitamin, and beta-amino-ethyl alcohol bound to glycerophosphoric radical in an amount adapted to make the propyl gallate an effective stabilizer in an amount in excess of the stabilization contributed by the independent operation of the two stabilizers.

3. A composition of matter consisting of vitamin A, a carrier for the vitamin, n-propyl gallate in an amount insufficient to stabilize the vitamin A for the desired period of time, and beta-amino-ethyl alcohol bound to glycerophosphoric radical in an amount insufficient to stabilize the vitamin A for the desired period of time but cooperating with the gallate to give the desired stabilization in an amount in excess of the stabilization contributed by the independent operation of the two stabilizers.

4. A composition of matter suitable for poultry or animal feed consisting largely of carbohydrates and carrying vitamin A and associated material, propyl gallate carried in said material and in an insufficient amount for stabilizing the vitamin, and beta-amino-ethyl alcohol bound to glycerophosphoric radical in an amount sufficient to make said gallate effective to stabilize the vitamin in an amount in excess of the stabilization contributed by the independent operation of the two stabilizers.

5. A composition of matter suitable for poultry or animal feed consisting largely of carbohydrates and carrying vitamin A, oil carrying said vitamin, propyl gallate carried in said oil in insufficient amount for stabilizing the vitamin, and beta-amino-ethyl alcohol bound to glycerophosphoric radical in an amount sufficient to make said gallate effective to stabilize the vitamin in an amount in excess of the stabilization contributed by the independent operation of the two stabilizers.

6. A composition of matter suitable for poultry or animal feed consisting largely of carbohydrates and carrying vitamin A, oil carrying said vitamin, a fraction of a per cent propyl gallate carried in said oil, and a fraction of beta-amino-ethyl alcohol bound to glycerophosphoric radical carried in said oil and together with said gallate stabilizing the vitamin in an amount in excess of the stabilization contributed by the independent operation of the two stabilizers.

7. The process of stabilizing the vitamin A content of an oil which consists in separately dissolving n-propyl gallate in hot oil, adding the dissolved gallate to the vitamin-carrying oil, and adding beta-amino-ethyl alcohol bound to glycerophosphoric radical so that it carries at least a fraction of a per cent of the gallate, and enough of the alcohol compound to effect stabilization in an amount in excess of the stabilization contributed by the independent operation of the two stabilizers.

JOHN KORNER.
HORATIO PORTER LOOMIS.